April 22, 1958   J. W. DEARBORN   2,831,695
WORKHOLDING FIXTURE
Filed July 12, 1955                                    3 Sheets-Sheet 1

INVENTOR
JOHN W. DEARBORN
BY
Steward & Steward
ATTORNEYS

INVENTOR
JOHN W. DEARBORN
BY
*Steward & Steward*
ATTORNEYS

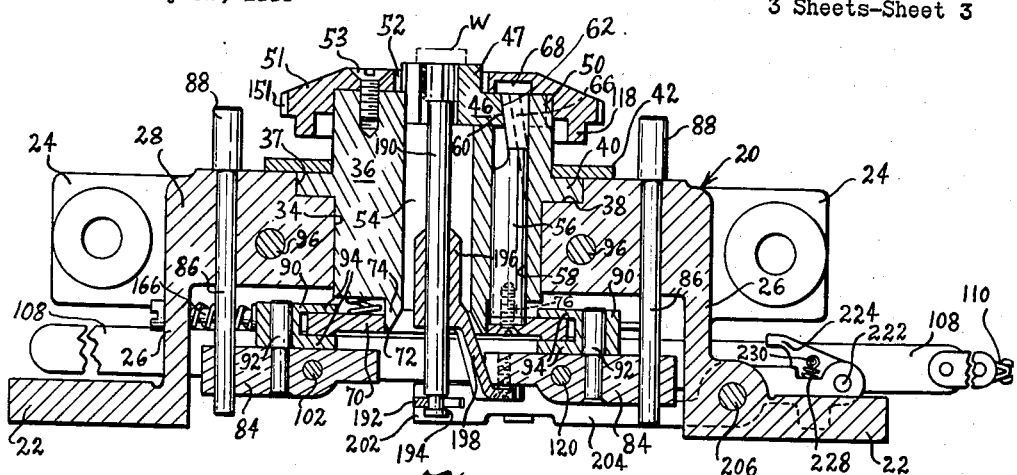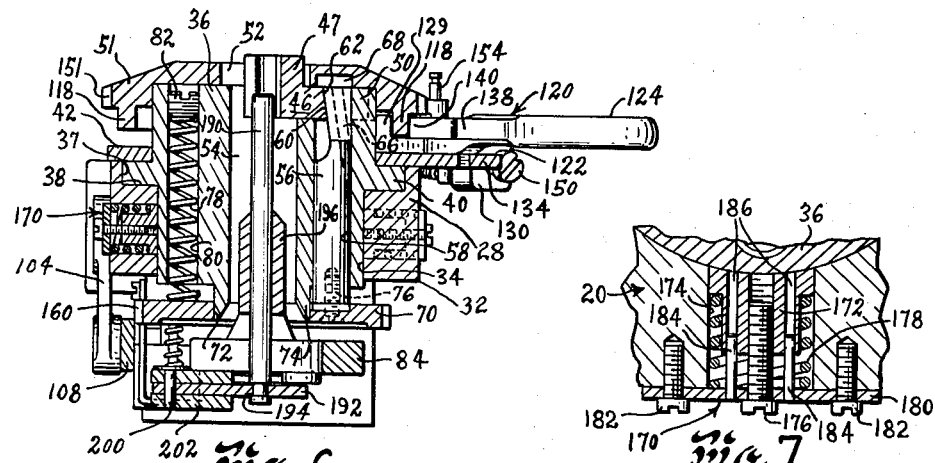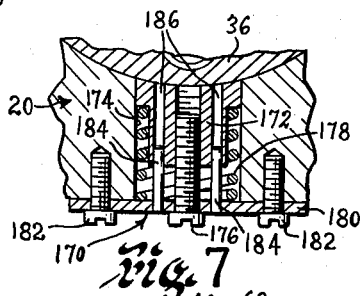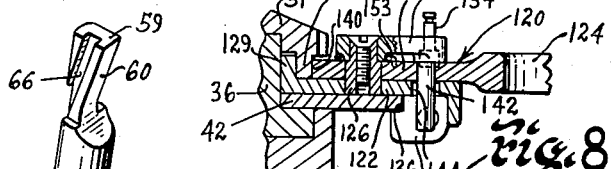

United States Patent Office 2,831,695
Patented Apr. 22, 1958

2,831,695

WORKHOLDING FIXTURE

John W. Dearborn, Ansonia, Conn.

Application July 12, 1955, Serial No. 521,436

9 Claims. (Cl. 279—5)

This invention relates to improvements in workholding fixtures and it relates more particularly to the type of fixture adapted for holding small parts such as screws, nuts, bolts, tubing and the like during such operations as milling, drilling, sawing, machining or threading.

In fixtures of this type, the frame of the fixture is ordinarily securely mounted on the horizontal reciprocating carriage of a machine which is to perform some particular operation on a workpiece securely gripped by the fixture. As the carriage moves toward the cutting tool of the machine, carrying with it the fixture and consequently the workpiece held thereby, the workpiece is moved into contact with the cutting tool which performs the required operation as the fixture passes by. If the fixture is of the indexing type and it is desired to perform the same operation on the work at various predetermined angles with respect thereto, the indexing head of the fixture may be rotated through a prescribed angle and then the work again passed through the machine to perform the operation on another face of the work. Successive operations of this sort are continued until the machining operation on the workpiece has been completed. In drilling operations where it is desired to drill holes at accurately spaced points about the center of the workpiece, the fixture is secured to a stationary bedplate and the work indexed between successive drilling operations as required.

In performing such operations, a large quantity of chips and shavings from the workpiece are formed by the cutting tool and, if the chips and shavings are not properly removed, they can seriously interfere with the operation performed, particularly when the fixture is mounted in such a position as to hold the work vertically. Compressed air is often used to blow the chips out of the fixture, but unless the fixture is designed to permit the chips to pass through it readily, it is usually necessary to shut down the machine periodically in order to dismantle the fixture and thoroughly clean it before it can be used again. Such periodic shutdown is time consuming and expensive. It is highly desirable therefore to provide adequate clearance within the fixture itself for the chips to pass through the fixture before they have an opportunity to lodge on or around the jaws and other parts of the fixture and so that it is an easy task to remove the chips by means of compressed air, for instance, in case they start to accumulate, without having to dismantle the fixture.

It is therefore an object of this invention to provide a workholding fixture having good chip clearance providing adequate space for chips to drop down through the center of fixture.

My prior Patent No. 2,186,236 dated January 9, 1940 and Patent No. 2,573,410 dated October 30, 1951 disclose workholding fixtures of the type contemplated in the present invention. The particular fixtures disclosed in these prior patents, however, employ a collet type of chuck for holding the work, in which the collet is movable axially so that it may be drawn down into a tapered aperture in the head of the fixture to contract the jaws of the collet into work engaging position. Such axial movement of the collet for engaging the work will cause variations in a milling operation, for instance, on workpieces which, while being substantially identical in most respects, may vary somewhat in diameter. The resulting variation in the milling operation on successive workpieces is due to the fact that if the diameter of one workpiece is less than that of another, it is necessary to retract the collect farther into the tapered aperture of the head of the fixture in order that the collet will grip the work with the same force on each workpiece. Thus, undesirable variations in the required operation may be introduced under such circumstances.

An important object of the present invention is to do away with this undesirable feature of the fixtures disclosed in the above-mentioned patents, while at the same time providing good chip clearance through the fixture.

It is also an object of the invention to provide a workholding fixture which is as sturdy in construction and as dependable in operation as the prior fixtures referred to above, but which is simpler and more economical to manufacture. A more specific object of the invention is to provide replaceable chuck jaws in place of the collet type chuck employed in fixtures disclosed in my above-mentioned patents. Among the advantages realized by using chuck jaws instead of collets is the considerably lower initial cost of furnishing a complete set of such jaws for gripping workpieces within the size limitations of the fixture as compared with the initial cost of a complete set of collets. This is due to the fact that the collets must be made of special spring steel and are expensive to manufacture.

Another object of the invention is to provide means for readily adjusting the gripping force of the chuck jaws so that if an operation is to be performed on a delicate workpiece, such as one in which the chuck jaws must grip screw threads or a thin-walled piece of tubing, the gripping force of the jaws may be reduced by means of a simple adjustment in order to avoid crushing the threads or collapsing the tubing.

A further important object of the invention is to provide in a single workholding fixture both the so-called "ratchet type" of indexing required where the angle through which the work is to be indexed must be within rather close tolerances, and the so-called "friction type" of indexing which permits indexing through angles of any desired size up to 180°.

These and other objects of the invention as well as its novel features and advantages, will become further apparent from the description hereinafter.

A workholding fixture embodying the invention in its most advantageous form is illustrated in the accompanying drawings, in which:

Fig. 5 is a longitudinal vertical sectional view, on the line 5—5 of Fig. 1;

Fig. 6 is a transverse vertical sectional view, on the line 6—6 of Fig. 1;

Fig. 7 is an enlarged detailed section, on the horizontal line 7—7 of Fig. 2, through one of the brake assemblies;

Fig. 8 is a detailed section, on line 8—8 of Fig. 1, through part of the indexing handle and indexing head to which the handle is attached;

Fig. 9 is a perspective view of one of the cam plungers;

Fig. 10 is a top plan view of one of the chuck jaws;

Fig. 11 is a side elevation partially broken away of the jaw shown in Fig. 10; and Figs. 12 and 13 show stop pins of two different sizes to illustrate how any particular angle through which it is desired to index the work may be obtained.

Figure 1:
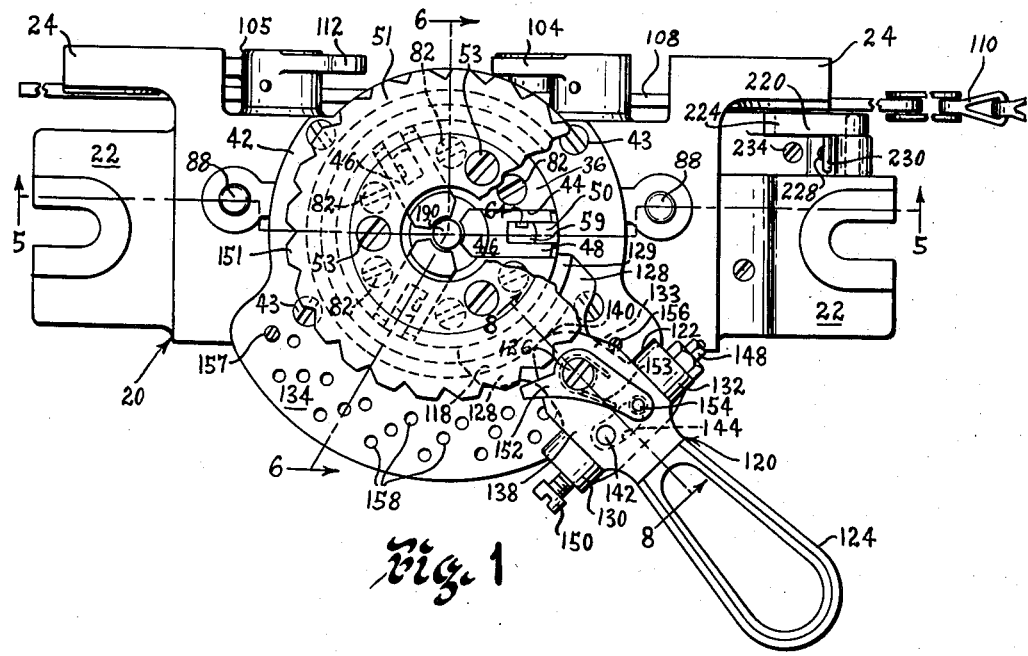
Fig. 1 is a top plan view, partially broken away, of an indexing-type fixture.

In the specific embodiment of the invention herein disclosed, the workholding fixture is provided with a rigid frame or body member 20, which is a substantially box-like structure forming a strong framework, such as a casting, for supporting the workholding chuck assembly and indexing parts. Frame 20 is provided with feet 22, by which it may be secured in a vertical position to a horizontal bedplate or carriage of a machine tool or the like. Ears 24 at the back of frame 20 are provided so that the fixture may be secured on its side in a horizontal position.

The frame 20 consists of vertical side walls 26 and an elevated horizontal table portion 28 which, as may be seen in Fig. 5, is of relatively thick section and is formed to support the indexing head and chuck actuating mechanism described in detail hereinafter. As may be seen in Figs. 2 and 4, the forward portion of horizontal table 28 is cut away on its under surface to form open spaces 30 which extend to the forward edge of the table portion and are located adjacent the side walls 26. A cylindrical boss 32 is formed centrally of frame 20 between spaces 30. As shown in Figs. 5 and 6, the horizontal table portion 28 of the frame is provided with a centrally located cylindrical passage 34 extending through the boss 32, in which is rotatably supported a cylindrical indexing head 36.

Figure 2:
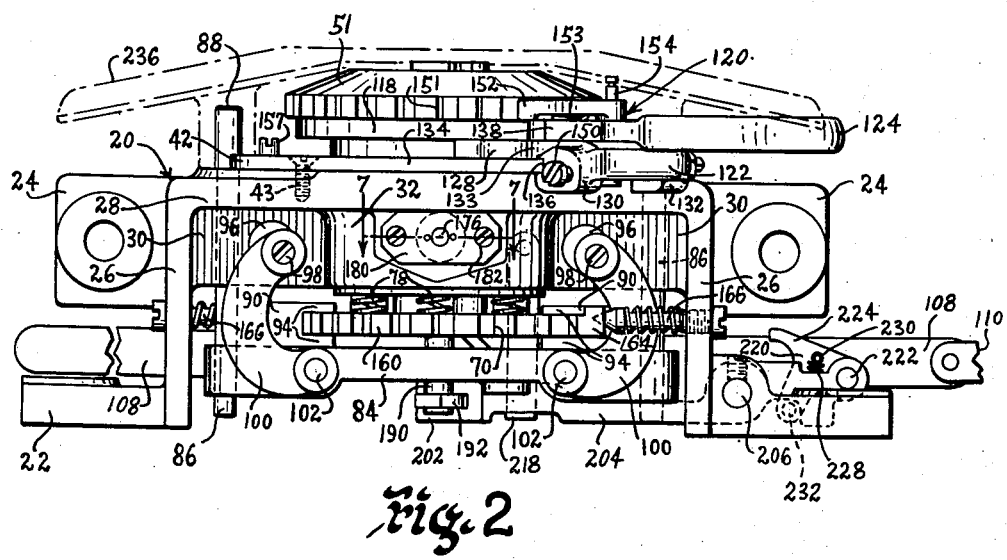
Fig. 2 is a view thereof in front elevation.

The upper end of the cylindrical passage 34 is provided with an annular recess 37 to form seat 38 constituting a smooth flat bearing surface against which the lower side of a horizontally disposed, circumferential flange 40 on the indexing head 36 is adapted to rest in order to support said head vertically within the frame of the fixture. Flange 40 is formed integrally with the cylindrical head 36 and extends circumferentially around its outer surface approximately midway between the ends thereof. The vertical thickness of flange 40 is slightly less than the depth of the annular recess 37 so that when a retaining ring or plate 42 is secured to the upper surface of the table portion 28 of the frame by means of screws 43 as shown in Figs. 1 and 2, the indexing head is freely rotatable within the passage 34 of the frame, but is securely held against axial movement relative thereto.

Three equally spaced, substantially rectangular guideways or slots 44, cut in the upper horizontal surface of the indexing head 36 and extending radially thereof, are adapted to receive chuck jaws 46 and to guide said jaws for radial movement into and out of work engaging position. Each chuck jaw 46 is substantially L-shaped, having a vertical leg 47 and a horizontal leg 48. The inner arcuate surface of the leg 47 is adapted to engage and hold a workpiece W centrally of the index head, while the horizontal leg 48 is received within one of the radial slots 44. As may be seen in Fig. 10, the horizontal leg 48 of each jaw 46 is provided with a vertical slot 49 which is open at the outer end of the leg 48 in order to receive a lug 50 which is integral with the head 36 and is located centrally of the radial slot 44. Lug 50 extends inwardly from the outer cylindrical surface of the indexing head 36, and is straddled by the two lateral sections of the leg 48 of jaw 46 as may be best seen in Fig. 1. An index ring 51, having a central circular aperture 52 through which the vertical legs 47 of the chuck jaws 46 extend, is rigidly secured to the upper surface of the head 36 by means of screws 53. The vertical dimension of the horizontal legs 48 of the chuck jaws 46 is substantially equal to or slightly less than the depth of the radial slots 44 in the indexing head 36, so that when the indexing ring 51 is secured in place the chuck jaws are free to move in their respective guide slots only in a radial direction.

The head 36 is bored centrally, as indicated by reference character 54, to provide ample clearance through the fixture for passage of metal chips during an operation on workpiece W held within the chuck. Actuation of the chuck jaws 46 is accomplished by means of camming plungers 56 which are slidable vertically in passages 58 extending longitudinally through head 36 from the bottoms of each of the guide slots 44. As may be seen in Fig. 9, each plunger 56 is substantially cylindrical throughout a major portion of its length but is formed at its upper end with a more or less rectangular section 59, which is adapted to fit within the slot 49 of the chuck 46 in order to cam the jaw radially into and out of work engaging position. To this end, one side of the rectangular section 59 of each plunger 56 is provided with an inwardly facing cam surface 60, which is inclined at an angle with respect to the longitudinal axis of the plunger and which is adapted to engage a correspondingly inclined surface 62 at the inner extremity of the slot 49 in jaw 46 of the chuck. Consequently, upon longitudinal movement of the plungers 56 downwardly, the chuck jaws 46 will be moved inwardly into work engaging position. As may be seen more particularly in Figs. 5 and 6, the outer vertical surface of the rectangular section of plunger 56 is coextensive with the vertical wall of the plunger and is adapted to be in sliding engagement with the inner surface of lug 50 which, therefore, reenforces the upper end of plunger 56 when it forces the jaw 46 into gripping engagement with the workpiece W.

In order to withdraw the chuck jaws 46 out of work engaging position, a cam lug 64, provided on one side wall of the slot 49 in the jaws 46 is adapted to be received in a groove 66 cut in the upper end of each plunger 56 at an angle parallel to the cam surface 60 thereof. Upward movement of the plungers 56, therefore, will cause the jaws to be moved outwardly disengaging them from the work W. In order to provide clearance for the ends of the plungers 56 to project above the upper surface of the legs 48 of the chuck jaws 46 when they are moved upwardly to open the jaws, recesses 68 are provided in the under surface of the indexing ring or jaw retaining member 51 adjacent each jaw, as may be seen in Figs. 5 and 6. Each plunger 56 is secured at its lower end to an actuating plate or ring 70 having a centrally located aperture 72 which fits over and is guided by a reduced diameter portion 74 at the lower end of the indexing head 36. Actuating ring 70 is therefore permitted limited vertical movement with respect to the indexing head 36 in order to move camming plungers 56 in unison upwardly and downwardly, thereby actuating chuck jaws 46 as hereinabove described. Each plunger 56 is tapped at its lower end and rigidly secured to ring 70 by means of a screw 76.

In order to provide the energy necessary to securely hold a workpiece in the chuck jaws 46, a plurality of actuating springs 78 exert a downward force against the upper surface of the actuating ring 70. As may be seen in Fig. 6 each actuating spring 78 is located in a vertical spring retaining passage 80 extending longitudinally through the indexing head 36, said passage being substantially equal in diameter to the major diameter of the actuating spring 78. The upper section of each spring retaining passage 80 is internally threaded to receive an adjusting screw 82, which may be turned down to increase the compression of the springs 78 or backed off to reduce the force exerted by the springs on the actuating ring 70. In the particular embodiment of the invention herein disclosed, six actuating springs are provided, these being located in the head 36 in a circle around the central passage 54 and substantially equally spaced from each other as may be seen in Fig. 1. It is apparent, therefore, that the jaws 46 are normally urged into gripping engagement with the workpiece W by means of the actuating springs 78 through actuating ring 70 and plungers 56.

It is clear from the foregoing that the gripping force exerted on the workpiece by the jaws 46 depends on the pressure exerted by the actuating springs 78 on the ring 70. When the springs 78 are further compressed by turning down on the adjusting screws 82, the pressure exerted downwardly on ring 70 is increased, which in turn causes the jaws 46 to grip the work with greater force. If, however, it is necessary to reduce the gripping force of the chuck jaws in order, for instance, to prevent crushing the threads by which a workpiece might have to be held in the fixture, it is only necessary, when the indexing ring 51 is removed, to back-off on the adjusting screws 82 the desired number of turns. Similarly, workholding fixtures of this type are frequently used to hold a workpiece consisting of a short length of thin-walled tubing which will withstand only a light gripping force without damage to the walls of the tube. On the other hand, the next job for which the fixture may be needed could very well require a much firmer grip on the work, the present fixture being especially well suited for wide variations in work because of the provision of the above described means for quickly adjusting the gripping force of the chuck.

Means are also provided for lifting the actuating ring 70 and plungers 56 against the urge of springs 78 so that the chuck jaws 46 will open and the work release. Thus, a releasing yoke 84 located below and extending parallel with the actuating ring 70 is slidably mounted for vertical movement on guide rods 86 located on opposite sides of the frame 20 and extending downwardly from the horizontal table portion 28. Guide rods 86 are secured by means of a press fit within the thick portion of table 28 and are provided with enlarged upper ends 88 projecting vertically above the top of the horizontal table 28 for a purpose which will become apparent hereinafter. When moved upwardly as viewed in Figs. 2 and 5, yoke 84 engages the under sides of oppositely disposed thrust transmitting members 90 which, as will become apparent hereinafter, serve also as pawls for a pawl and ratchet arrangement and, to this end, are each pivotally mounted on a vertical stud 92 secured in the yoke 84. Pawls 90 are provided with vertically spaced, horizontally extending arms 94, which embrace the actuating ring 70 adjacent its periphery. Consequently, any upward thrust by the releasing yoke 84 against the under surfaces of pawls 90 is transmitted to the actuating ring 70 for lifting the latter against the downward force exerted on it by the actuating springs 78.

Figure 3:
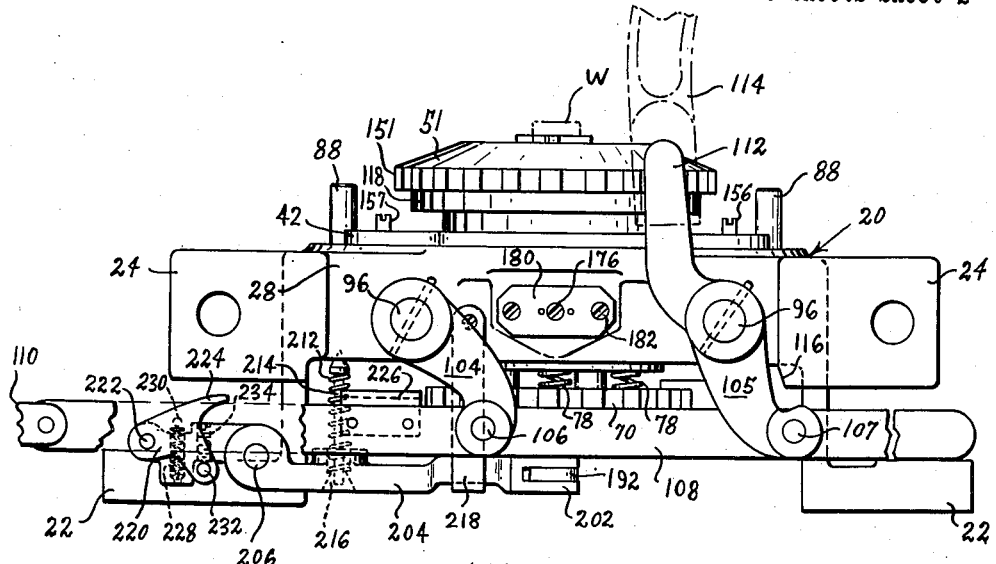
Fig. 3 is a rear view of the fixture in elevation.

A pair of shafts 96 are journalled transversely in the table portion 28 of the frame, the forward or inner ends of which emerge on either side of the boss 32 within the recesses 30. At the inner end of each of the shafts 96 is provided an eccentric stud 98, upon each of which is pivotally mounted an arcuately shaped lifting arm 100, which may be best seen in Fig. 2. The lower ends of lifting arms 100 are pivotally connected to pins 102 which are fixed to and project horizontally from releasing yoke 84. To the rear or outer ends of shafts 96, which extend outwardly from the rear edge of table 28, are secured connecting arms 104, 105, the lower ends of which are pivotally connected at 106, 107 to a horizontal coupling bar 108 (Fig. 3).

Coupling bar 108 has a chain 110 secured to one end thereof, the opposite end of said chain being secured, as desired, to any stationary part of the particular machine upon which the fixture is used for effecting automatic release of an article gripped by the jaws 46 of the chuck. As the fixture, and consequently the article held thereby, passes beneath the cutting tool of the machine by reciprocation of the bedplate or carriage upon which the fixture is mounted, and the required operation is performed upon the workpiece, the coupling bar 108 will, near the end of the stroke of the bedplate or carriage, be held stationary due to chain 110 preventing any further movement of said bar 108, while the fixture itself is moved a slight distance farther so as to cause the lower ends of the connecting arms 104, 105 to swing with respect to the fixture from right to left, as viewed in Fig. 3, thereby rotating shafts 96 causing the eccentric studs 98 at the inner ends of shafts 96 and lifting arms 100 to be raised.

Such upward movement of the eccentric studs 98 and arms 100 lifts the releasing yoke 84 causing the actuating ring 70 and plungers 56 to move upwardly to open the chuck jaws 46 as hereinbefore described. In order that the workpiece may be released manually instead of automatically, connecting arm 105 is provided with an upwardly extending finger 112 to which may be connected a handle 114, shown in broken lines in Fig. 3, by which the shafts 96 may be rotated in a clockwise direction as viewed in Fig. 3 to open the chuck jaws.

It will be noted that when a workpiece W is held by the chuck, the jaws 46 do not of course move inwardly as far as they would if there were no work in the chuck and, consequently, plungers 56 whose cam surfaces 60 exert the required gripping force against the jaws 46 are permitted to move downwardly only a certain distance depending on the diameter of the particular workpiece held in the chuck. The downward movement of plungers 56 and actuating ring 70 being thus arrested, releasing yoke 84 is relieved of the force exerted by the actuating springs 78 through the ring 70 and pawls 90. Yoke 84 may in fact be moved downwardly a slight distance below the under surface of pawls 90 when the eccentric studs 98 on shafts 96 are returned to their normal positions. Studs 92, which are fixed to yoke 84, are slidable longitudinally within pawls 90 to permit the yoke 84 to move out of engagement if necessary with pawls 90 while a workpiece is held in the chuck.

However, when there is no workpiece in the chuck, the ring 70 continues to move downwardly with the yoke 84 to which is transmitted the total force exerted by the actuating springs 78. In order to arrest downward movement of the actuating ring 70 when there is no work in the chuck, the shafts 96 on which eccentric studs 98 are mounted are prevented from rotating in a counterclockwise direction as viewed in Fig. 3 beyond a predetermined point by means of a stop surface 116 on one of the ears 24 of frame 20, with which the connecting arm 105 is adapted to come in contact. This effectively prevents further lowering of the eccentric studs 98 and consequently of the yoke 84, pawls 90 and ring 70 beyond a predetermined point.

The means for indexing the chuck and indexing head assembly is generally similar to that shown in my Patent No. 2,573,410 and includes both the so-called "ratchet indexing" and "friction indexing," enabling an operator to index the workpiece through equal arcs of rotation varying from as little as a fraction of a degree to as much as 180°. However, in the present instance, the fixture can be shifted from one type of indexing to the other by making simple adjustments, whereas in my prior fixtures, it was necessary to partially disassemble the fixture in order to shift from ratchet indexing to friction indexing or vice versa.

A depending annular flange 118 is provided on the under side of ring 51 adjacent the periphery thereof. Flange 118 is integral with ring 51 and is adapted to be frictionally gripped by an indexing handle assembly designated generally by reference character 120, by which the index ring 51 and head 36 may be rotated only in a clockwise direction as viewed in Fig. 1. The indexing handle assembly 120 is made up primarily of two parts, one being a yoke member 122 and the other an operating handle 124, which is pivoted to the yoke member 122 by means of a bearing post 126 fixed in said yoke member 122. Yoke member 122 is provided at its inner end with arcuate, outwardly diverging arms 128 (see Fig. 1), the inner arcuate edge of which has a diameter substantially equal to the diameter of the outside surface of the indexing head 36. Along said arcuate edge of arm 128 is provided an integral upstanding flange 129 adapted to be received in the annular space between the outer surface of the indexing head 36 and the inner side of flange 118 on the index ring 51. The outer end of yoke member 122 is provided with an enlarged portion having a pair of depending spaced bosses 130, 132, best shown in Figs. 1 and 4. Said diverging arms 128 and enlarged portion of the yoke member 122 are connected by a neck portion 133. Yoke member 122 is slidingly supported on its under surface by the previously described retaining plate 42, which extends outwardly along its front edge to form a flat semicircular shelf 134. The outer edge of the shelf 134 of plate 42 is engaged within notches 136 (Fig. 8) in bosses 130, 132 of the yoke member 122 in order to secure the handle assembly 120 to the fixture while at the same time permitting it to swing horizontally along the arcuate shelf 134 of plate 42, as viewed in the drawings.

The inner end of handle 124 is provided with a flat cam portion 138 which is pivoted on post 126 against the upper flat surface of yoke member 122. The inner camming edge 140 of cam portion 138 is adapted to engage the outer side of flange 118 on the index ring 51 when the operating handle 124 is pivoted clockwise, as shown in Fig. 1, about the bearing post 126. Consequently, when the operator grasps the operating handle 124 and moves it from right to left, as viewed in Fig. 1, flange 118 on the index ring is gripped between the upstanding flange 129 of yoke member 122 and the camming edge 140 of the operating handle 124. Further movement of the handle assembly 120 in the same direction by the operator causes the indexing handle assembly to pick up the indexing head and to rotate it through an arc corresponding to the throw of the handle. On the return stroke of the indexing handle 120, the operating handle 124 is pivoted about post 126 in a counterclockwise direction moving its cam edge 140 out of binding contact with the outer surface of flange 118 so that the indexing handle may be returned to its initial position without carrying the indexing head with it.

Figure 4:
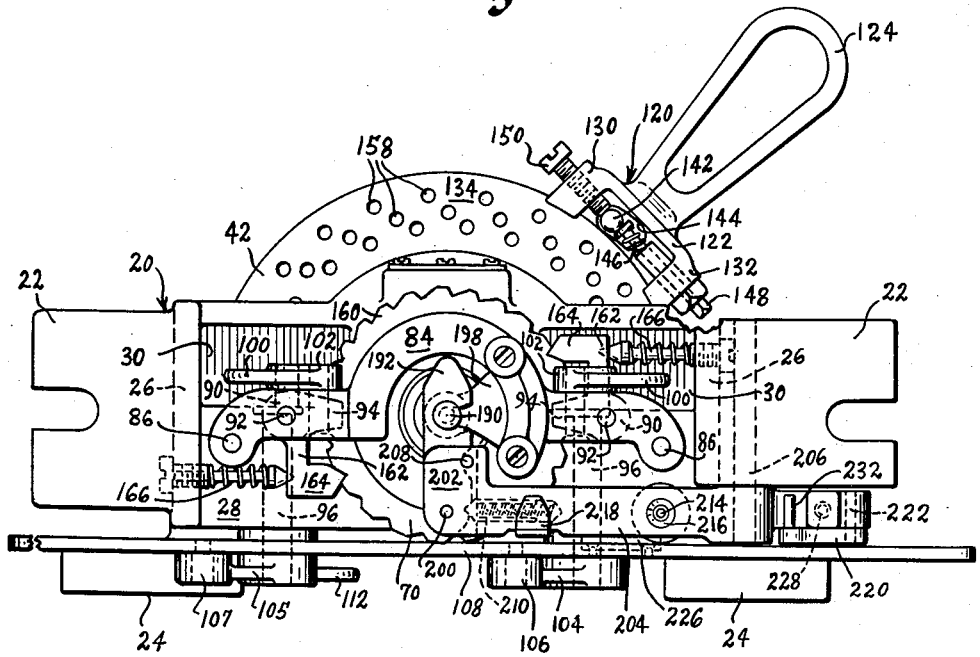
Fig. 4 is a bottom plan view thereof.

The pivotal movement of the operating handle 124 with respect to the yoke member 122 is limited by means of a pin 142 fixed in the flat cam portion 138 of the handle 124 and extending downwardly therefrom through an elongated slot 144 in yoke member 122 (Figs. 1, 4 and 8). As may be best seen in Fig. 4, a spring loaded plunger 146 is mounted in boss 132 of yoke member 122 and is adapted to engage the adjacent side of pin 142. Plunger 146 may be adjusted longitudinally by means of nut 148 which is threaded onto the outer end thereof. Screw 150 is threaded into the opposite boss 130 and is adapted to engage the opposite side of pin 142 to limit the pivotal movement of the operating handle 124 with respect to yoke member 122 in this direction. Consequently, if screw 150 is screwed inwardly a sufficient distance against the urge of spring plunger 146, the operating handle 124 is pivoted counterclockwise about post 126, as viewed in Fig. 1, so that the camming surface 140 is prevented from engaging flange 118 on the index ring 51, rendering the so-called friction indexing mechanism inoperative.

Index ring 51 is further provided on its periphery with a plurality of ratchet teeth 151 which, in accordance with common practice, may be twenty-four in number for indexing the head 36 through an angle of 15° or any multiple thereof. An index pawl 152, pivoted on the post 126 on the upper surface of the cam portion 138 of the operating handle 124, is adapted to be urged into engagement with ratchet teeth 151 of index ring 51 by means of a wire spring 153, which extends around the bearing post 126 and has one end secured to the under side of pawl 152 and the other end to the upper side of portion 138. Thus, when the fixture is used to index work through angles which are multiples of fifteen, the index pawl 152 may be used by bringing it into engagement with the teeth 151 of the index ring 51 so that upon swinging the indexing handle 120 in a clockwise direction as viewed in Fig. 1, the index ring 51 and head 36 will be rotated with the handle. This is what is known as "ratchet indexing."

During friction indexing, index pawl 152 is held out of engagement with ratchet teeth 151 by moving a lock pin 154, which is vertically slidable in an outwardly extending portion of pawl 152, downwardly into a recess provided in the upper face of the flat cam portion 138 of the handle member 124. When it is desired to shift from friction indexing to ratchet indexing, the cam surface 140 of the friction indexing mechanism is moved out of engagement with the flange 118 of index ring 51 to render the friction means inoperative as described hereinabove. It is then only necessary to disengage lock pin 154 from its recess in the handle 124 permitting the nose of the pawl 152 to engage the ratchet teeth on the indexing ring 51. The chuck and indexing head may then be indexed through an angle of 15° or any multiple thereof in the usual manner. The ease with which the fixture may be shifted from one type of indexing to the other by making simple adjustments on the fixture is an important feature of this invention.

In order to set the angle through which the head and workpiece held therein are to be indexed, the horizontal throw of the indexing handle 120 is limited by stop lugs 156, 157, which may be threadedly secured in any of apertures 158 arranged in spaced relation on the semicircular shelf portion 134 of the retaining plate 42. Stop lug 156 is located on one side of the indexing handle 120 to limit the movement of the handle to the right as viewed in Fig. 1, while stop lug 157 is located to the left of the handle to limit its throw in the other direction. With reference to Fig. 1 of the drawings, the starting or zero position of the indexing handle is, in this case, located as far to the right as possible, the stop lug 156, with which the right-hand edge of the neck 133 of yoke member 122 engages, being screwed into the last hole to the right on the shelf 134. The stop lug 157 is located in the last hole to the left for engagement by the left-hand edge of neck 133 when the index handle 120 is swung as far to the left as possible. It will be noted that since the cam portion 138 of the handle member 124 is wider than the neck portion 133 of the yoke 122, the stop lugs 156, 157 pass slightly under the cam portion 138 when the handle is brought into engagement with them. Since the cam portion 138 is pivotable on the yoke 122, it is important for accurate indexing to be sure that the stop lugs come into engagement with the yoke member rather than the cam or handle portion of the indexing handle assembly 120.

With the stop lugs 156, 157 in the positions shown in Fig. 1, the fixture will index the work through an angle of 90° or, by swinging the indexing handle through two throws between each operation on the work, the work will be indexed through an angle of 180°. As shown in Fig. 1, the index pawl 152 is held out of engagement with the ratchet teeth 151 and the friction indexing mechanism is adjusted for operation. The head will, therefore, be indexed through the 90° or 180° angles by the friction means hereinbefore described. However, it is usually desirable, for reasons which will become apparent hereinafter, to use the ratchet indexing system rather than the friction means for angles which are multiples of 15, and the fixture will, when indexing angles of 90° for instance, ordinarily be shifted to ratchet indexing.

Each of the holes 158 is spaced from the adjacent holes a distance which is equal to 5° of arc. In order to save space while at the same time make the stop lugs strong enough to withstand considerable shock, they are arranged in the staggered relation shown in the drawings. By moving the stop lug 157 from the position shown in Fig. 1 to the next adjacent hole, the work will be indexed through an angle of 85°. However, since 85 is not a multiple of 15, friction indexing must be used instead of ratchet indexing which, in this particular embodiment of the invention, is capable of indexing only through angles which are multiples of 15 as mentioned hereinbefore. From the foregoing, it will be apparent that by simply shifting the stop lug 157 in the holes 158, any desired angle which is a multiple of 5 can be indexed but, in order to use ratchet indexing, only angles which are multiples of 15 can be indexed. It should also be noted that if it is desired to keep the indexing handle in the center of the fixture when indexing small angles, the stop lug 156 on the right-hand side of the handle can be moved to any desired position in order to change the starting or zero position of the indexing handle. Holes 158 are provided along the entire arcuate surface of the shelf 134, as may be seen in Fig. 4, for this purpose.

In order to index the workpiece through angles of less than 5°, stop lugs having head portions of different diameters may be used. Fig. 12 shows a standard stop lug 157 as used for indexing angles which are multiples of 5. If it is desired to index angles other than multiples of 5, including fractions of degrees, a stop lug 157a (Fig. 13), which has a head of greater diameter than the head of lug 157, is used. To take one specific example for illustrative purposes, the head of a standard stop lug 157 may be .25 inch in diameter for use in a particular fixture in which the radius from the center of the fixture to the middle row of holes 158 is 3⅛ inches. Assuming the head of stop lug 157a to be .359 inch in diameter or .159 inch greater than lug 157, the angle indexed when using lug 157a will be one degree less than that if lug 157 is used. In other words, for this particular fixture having a radius of 3⅛ inches from its central axis to the point at which the indexing handle engages the stop lugs, a difference in the linear stroke of the indexing handle of .0545 inch (i. e. one half the difference in diameters of the two lugs) changes the size of the angle indexed by one degree. It is apparent from the foregoing that any desired angle can be obtained by varying the size of the stop lugs.

Since staggering the positions of the holes 158 into which the stop lugs are threaded introduces a slight error, the edges of the neck portion 133 which engage the stop lugs should be carefully machined, if a high degree of accuracy is necessary when friction indexing. The inaccuracy due to staggering the holes 158 may be compensated for by machining the edges of neck 133 at a predetermined angle with respect to a radius through the indexing handle from the central axis of the fixture, such angle depending on the amount that the holes 158 are offset from each other radially of the fixture. However, so far as ratchet indexing is concerned, this is not of any particular importance in the embodiment of the invention here described, because the stop lugs are always located an equal distance from the central axis for ratchet indexing. Moreover, as will be explained hereinafter, other means are provided for ensuring accuracy during ratchet indexing.

It is of course necessary to ensure that the indexing head is not accidentally moved between throws of the indexing handle 120 or when said handle is being returned to its initial position. To this end, the beforementioned actuating ring 70 is provided on its periphery with ratchet teeth 160 (see Fig. 4) which correspond in position and number exactly with teeth 151 on the index ring 51. Pawls 90 are each provided with a laterally extending arm 162 having at its outer end a nose portion 164 adapted to engage in the notches between teeth 160. Nose portions 164 of pawls 90 are urged into engagement with teeth 160 by means of spring loaded plungers 166, each secured at its outer ends in vertical side walls 26 of the frame 20 of the fixture and engaging at its inner end the back side of the arm 162 of one of the pawls 90. Since the teeth 160 of ring 70 are accurately aligned with the teeth 151 of index ring 51, it is apparent that during ratchet indexing of the workpiece held in the fixture, the nose portions 164 of pawls 90 will be engaged in the notches between teeth 160 whenever the index pawl 152 engages a corresponding notch between the ratchet teeth 151 on the index ring 51, as for instance, when the indexing handle 120 is in its initial position shown in Fig. 1. It will be noted, moreover, that the sides of the notches between the teeth 160 are inclined more sharply on one side than on the other, the arrangement being such that when the nose portions 164 of pawls 90 are engaged within the notches, rotation in a clockwise direction as viewed in Fig. 4 is positively prevented. If, on the other hand, sufficient torque is applied to the index head in a counterclockwise direction (Fig. 4), as for instance by means of the handle assembly 120, the pawls 90 will be pivoted out of the notches against the force of spring plungers 166.

Spring plungers 166 exert considerable force on the pawls 90 to ensure firm engagement of their nose portions 164 in the notches between the teeth 160 of ring 70 during ratchet indexing. In fact sufficient force is exerted tangentially of the circumference of the ring by the pawls 90 to cause the ring 70 and index head 36 to be rotated a small amount in the event that the pawls do not fully engage in the notches when the indexing handle is actuated. For instance, due to the rapidity with which the operator of a machine sometimes throws the indexing handle of the fixture to index the work, he is quite likely to fail to move the indexing handle into full engagement with the stop lug. Since it is assumed that the fixture is adjusted for ratchet indexing, the pawls 90 should be in full engagement between the teeth 160 upon each throw of the indexing handle. However, if for the reason mentioned above the ring 70 is not moved far enough to permit full engagement of pawls 90 in the notches, the force exerted by the pawls on ring 70 will rotate said ring until the pawls are fully engaged with the notches in the manner shown in Fig. 4. Consequently, the workpiece will be accurately indexed during ratchet indexing even though the operator may inadvertently fail to move the indexing handle through the entire angle to be indexed.

In order to facilitate rotation of the index head by the pawls 90 under the circumstances noted above, the sides of the notches between teeth 160 are cut at different angles. Usually, where an error occurs, it is due to the fact that the indexing handle is not moved quite far enough so that the tip of the nose portion 164 engages the back side of one of the teeth 160. This side of each tooth, therefore, is cut at a sharper angle than the other side of the tooth in order that the pawl may more readily rotate the ring 70 into proper position. The sides of the notches between the teeth 160 may be cut, for instance, at 30° and 60° respectively, with respect to a radius through the base of each notch. As has been pointed out hereinbefore, this angular difference in the sides of the notches and teeth also prevents the index head from being inadvertently rotated backward, either during indexing or while the work is being operated on. The teeth 151 of the index head 51 are cut in the same manner as teeth 160. The back of each tooth as referred to above means the side opposite the direction of rotation of the index head 36, which as shown in the accompanying drawings is always clockwise in Fig. 1 and counterclockwise as viewed in Fig. 4.

When the fixture is set up for friction indexing instead of ratchet indexing, the pawl and ratchet arrangement associated with the actuating ring 70 becomes ineffective, except where by coincidence the pawls 90 may fully engage in the notches between teeth 160. This is due to the fact that when friction indexing is being used the angles through which the work is being indexed are generally not multiples of the angle at which the teeth 151 and 160 occur. It is, therefore necessary to provide brake means for preventing accidental rotation of the index head 36. To this end, friction brake assemblies 170 are provided on opposite sides of the index head 36 for exerting the necessary drag on index head 36 during friction indexing and are arranged so that their braking force can be easily removed during ratchet indexing when it is not desired or necessary.

Each brake assembly 170 consists of a friction block 172 adapted to frictionally engage the cylindrical surface of the index head 36. Friction block 172 is mounted in an opening 174 in the frame of the fixture for movement into and out of engagement with head 36. Block 172 has a central aperture into which is threaded an adjusting screw 176, and a compression spring 178 surrounding said adjusting screw is compressed between an annular shoulder formed in the friction block 172 and a retaining plate 180 which is secured by means of screws 182 to the frame 20 of the fixture. Guide pins 184 fixed at one end in the retaining plate 180 extend into guide passages 186 in the friction block 172 on either side of adjusting screw 176 for preventing rotation of the friction block when screw 176 is turned down to remove the pressure applied by the friction block to the index head. The shank of screw 176 fits freely through an aperture in the center of retaining plate 180 with the shoulder formed by the head of the screw 176 abutting the outside surface of retaining plate 180. It is apparent that when the adjusting screw 76 is threaded into friction block 172 sufficiently, the friction block will be withdrawn against the urge of the pressure spring 178 out of engagement with the outside cylindrical surface of the index head 36. Consequently, when it is desired to remove the drag of the brake assemblies 170, as is usually the case when it is desired to index by means of the ratchet, all that the operator need do is to turn down on screws 176 to disengage the friction blocks 172.

Means are also provided for automatically ejecting a workpiece from the fixture immediately after release of the work by the jaws 46. Thus, an injector rod 190 extends upwardly through the center of passage 54 in the indexing head 36 for engagement at its upper end with the bottom of the workpiece W held in the jaws of the chuck. Ejector rod 190 is supported at its lower end by means of a hook-shaped link 192 (Fig. 4), which is adapted to interlock in a circumferential groove 194 in the rod 190. Ejector rod 190 is adapted to pass through a guide sleeve 196 secured by means of a bracket 198 to the yoke 84, as shown for instance in Figs. 4 and 5. Link 192 is pivoted at 200 within the forked end of portion 202 of an ejector actuating lever 204 pivoted on a shaft 206 extending transversely through the base of frame 20 of the fixture.

Link 192 is normally held in the position shown in Fig. 4 by means of a positioning pin 208 located on the forked end 202 of lever 204 and also by means of spring detent 210 located longitudinally within the shank of lever 204. Consequently, when it is desired to remove ejector rod 190, either for replacement purposes or else to do away with it for some particular operation, it is only necessary for the operator to pivot link 192 out of engagement with the ejector rod 190, thereby permitting said rod to drop down through its guide 196 and out through the bottom of fixture. It is of course understood by those skilled in the art that different length ejectors may be used for positioning the workpiece axially in the chuck.

As may be seen more particularly in Figs. 3 and 4, the free end of ejector actuating lever 204 is normally urged downwardly by means of a spring 212 which engages the upper side thereof and is guided on a pin 214 positioned at its upper end in the under side of table portion 28 of the frame 20. The upper end of pin 214 has a shoulder against which spring 212 is compressed and the lower end of pin 214 is adapted to pass freely through an aperture 216 provided in lever 204. The free end of lever 204 is supported underneath by a bar 218 secured at its upper end to the rear face of table portion 28 and having its lower end bent inwardly at right angles for engagement with the under surface of lever 204 thereby limiting the downward movement of the lever 204.

The opposite end of ejector lever 204 on the other side of its pivot 206 is provided with a tripping member 220 which is pivoted to lever 204 at 222. Tripping member 220 has a finger portion 224 adapted to be engaged by a tripping lug 226 on coupling bar 108 when the latter is swung from right to left, as shown in Fig. 3, in order to release the work. The finger portion 224 of tripping member 220 is normally urged upwardly into position for engagement by lug 226 by means of a compression spring 228 located in a recess in lever 204 and acting upwardly on a pin 230 projecting laterally from tripping member 220. A stop pin 232 projects laterally from the tripping member 220 for engagement with an adjusting screw 234 threaded vertically through ejector actuating lever 204 to limit the pivotal movement of the tripping member in a counterclockwise direction, as viewed in Fig. 3. Consequently, by adjusting screw 234 the vertical position of finger portion 224 may be adjusted for proper engagement by tripping lug 226. It will be noted, moreover, that the finger portion 224 may be lowered sufficiently by means of screw 234 so that lug 226 will not engage the tripping member, thereby rendering the ejector mechanism inoperative.

Operation of the ejector mechanism is believed to be obvious from the foregoing but will be summarized briefly here. Thus, when the carriage of the machine, on which the fixture is mounted, is moved so that the chain 110 connected to one end of the coupling bar 108 becomes taut, thereafter effecting relative movement of bar 108 from right to left with respect to a fixture shown in Fig. 3, the jaws of the chuck are opened as hereinbefore described. Thereupon lug 226 comes into engagement with the tip of finger portion 224 causing the ejector actuating lever 204 to pivot clockwise, as viewed in Fig. 2. This raises the ejector rod 190 knocking the workpiece out of the chuck. The tip of finger 224 is so adjusted with respect to the tripping lug 226 that, as soon as the ejector lever 204 has been pivoted sufficiently to eject the workpiece, the finger 224 is lowered due to its being mounted on the pivoted ejector lever 204 so that it passes under the flange portion of tripping lug 226 thereby permitting said lug to pass over the top of tripping member 220. This in turn permits the ejector lever 204 to be returned to its normal position by means of spring 212 and to lower the ejector rod 190. In this condition the jaws of the chuck are open ready to receive the new workpiece, the ejector rod 190 being in its normal position for positioning the next piece of work to be used. As the carriage moves again toward the cutting tool, the coupling bar 108 is permitted to move back to its original position, the jaws of the chuck automatically gripping the work as hereinbefore described. During the return stroke of the coupling bar 108 the tripping lug 226 engages the rear edge of the tripping member 220 causing it to be depressed against the spring 228 which, as soon as the lug 226 has travelled on by, will return the member 220 to its normal position for actuation of the ejector means when the operation on the work is completed.

A cover 236 shown in phantom lines in Fig. 2 is usually provided for carrying off the bulk of the chips cut during the operations on the workpiece. Cover 236 is arranged to be supported by the enlarged upper ends 88 of rods 86 which fit into bosses on the underside of the cover.

While most of the chips are carried off by means of cover 236, the smaller ones drop down into the fixture which, if it is not designed to provide clearance all the way through it, would become easily clogged and require frequent disassembly for cleaning purposes. However, the central passage 54 extending all the way through the present fixture provides adequate clearance for chips.

Moreover, the chuck jaws and their actuating means do not interfere with such chip clearance and have a distinct advantage over the collet type chuck heretofore used in that once the fixture is set up for a particular job, the workpieces are each accurately positioned axially of the fixture regardless of normal variations in the size of each individual workpiece.

Other important advantages of the present fixture over prior workholding fixtures are its great versatility and ease with which it may be adjusted for special operations and special types of workpieces. Thus, fixtures according to the present invention can be changed from ratchet indexing to friction indexing without disassembling the fixture as has been necessary heretofore. Set-up time is, therefore, considerably reduced. Moreover, by simply adjusting the pressure exerted by the actuating springs, the fixture may be used for holding delicate parts. Heretofore, it has been necessary either to use an entirely different fixture for thin-walled tubing or threaded pieces, for instance, or to disassemble the fixture and remove some of the actuating springs or replace them with lighter ones. Adjustability of the chuck jaw actuating springs is therefore a distinct improvement in the art. In addition, the jaws 46 of the chuck can be easily replaced with jaws of different size to hold either larger or smaller size workpieces by simply removing the index ring 51. Jaws 46 may then be lifted out of the guideways 44 in the index head 36 and new ones inserted in place of them.

What is claimed is:

1. In a workholding and indexing fixture, the combination of a cylindrical indexing head, a frame having a cylindrical passage in which said indexing head is rotatably supported, said indexing head having a central axis and a passage extending completely through said head along said axis, a plurality of guideways formed in said indexing head radially from said central passage, chuck jaws located in said guideways adapted to be moved into and out of work engaging position adjacent said central passage, means for retaining said jaws in said guideways, each of said jaws having a camming member associated therewith mounted on said indexing head and spaced radially from said central passage for moving said jaws into and out of work engaging position, said camming members being secured to a centrally apertured actuating plate for actuating said jaws in unison, means associated with said actuating plate for exerting pressure thereon in opposite directions to cam said jaws into and out of work engaging position, indexing means capable of gripping said indexing head and rotating it through a predetermined angle, and brake means for said indexing head comprising oppositely disposed brake assemblies mounted in the wall of said cylindrical passage of the frame for firmly engaging the periphery of said indexing head whereby said head is frictionally held against rotation except when rotated by said indexing means.

2. In a workholding and indexing fixture having a cylindrical indexing head, a frame having a cylindrical passage in which said indexing head is rotatably supported, the indexing head having a chuck for holding a workpiece, and indexing means for rotating said head through a predetermined angle, the combination of brake means for said indexing head comprising oppositely disposed brake assemblies mounted in the wall of said cylindrical passage of the frame for firmly engaging the periphery of said indexing head whereby said head is frictionally held against rotation within said frame except by said indexing means, each of said brake assemblies being housed in an opening through the wall of said frame and comprising a friction block reciprocably mounted in said opening, a compression spring urging said friction block into engagement with the periphery of said indexing head, a cover member secured to said frame and adapted to retain said friction block in said opening, and an adjusting screw threadedly connected to said friction block and passing freely through an aperture in said cover member, a head portion of said screw being adapted to engage said cover member to limit the passage of said screw through said aperture whereby said friction block may be withdrawn from engagement with said indexing head by means of said adjusting screw.

3. In a workholding and indexing fixture having an indexing body rotatably supported in a frame, and a chuck in said indexing body for holding a workpiece, the combination of an indexing handle having a cam portion movable into frictional engagement with said indexing body adjacent its periphery upon pivotal movement of said indexing handle, means for rendering said cam portion inoperative, said indexing body having ratchet teeth on its periphery, an indexing pawl pivotally mounted on said handle and normally urged into engagement with said ratchet teeth, said pawl having means for rendering it inoperative, and brake means for preventing rotation of said indexing body except upon pivotal movement of said indexing handle, said brake means comprising pawl and ratchet members operable when said indexing pawl is operative and a friction assembly mounted in said frame and engageable with the periphery of said indexing body, and means for releasing said friction assembly from engagement with said indexing body when said indexing body is rotated by means of said indexing pawl on said indexing handle.

4. The combination defined in claim 3, wherein a pair of said friction assemblies are provided on opposite sides of said indexing body, each of said assemblies comprising a friction block movable into and out of engagement with the periphery of said indexing body in a passage in the frame in which said body is rotatably supported, said friction block being urged into frictional engagement with said body by a compression spring, adjusting means being provided for moving said friction block out of frictional engagement with said indexing body.

5. The combination defined in claim 4, wherein a second positioning pawl is located adjacent the periphery of said actuating plate opposite the first-mentioned positioning pawl for engagement with the ratchet teeth thereon.

6. The combination defined in claim 5, wherein said means for opening said chuck comprises a yoke member guided on said frame for movement parallel to that of said actuating plate, each of said pawls being pivoted to said yoke member and having a portion engaging at least one side of said actuating plate adjacent its periphery so that pressure may be exerted by said yoke member on said actuating member through said pawls, and lever means for causing said yoke member to exert such pressure.

7. The combination defined in claim 6, wherein said means for closing said chuck comprises a plurality of springs mounted in said indexing body and exerting pressure on said actuating plate in a direction opposite to the pressure exerted by said yoke member.

8. In a workholding and indexing fixture, the combination of an indexing body rotatably mounted in a frame about a central axis, a chuck in said indexing body for holding a workpiece, means for indexing said body comprising ratchet teeth spaced at predetermined intervals around the periphery of said indexing body and a pawl pivotally mounted on a handle member for engagement with said teeth, a chuck actuating plate mounted coaxially with said indexing body and guided thereby for axial movement only with respect thereto, said actuating plate being associated with said chuck for opening and closing the same and having ratchet teeth on its periphery corresponding with the ratchet teeth on the periphery of said indexing body, a positioning pawl resiliently urged into engagement with said ratchet teeth on the actuating plate for preventing rotation of said plate and indexing body in one direction, means associated with said actuating plate for exerting pressure axially thereon in one direction for closing said chuck, and means for exerting pressure on said actuating plate in the opposite direction for opening said chuck.

9. The combination defined in claim 8, wherein said indexing body is provided with a plurality of elongated passages spaced from said central axis and extending axially through said body, each of said passages at the end adjacent said chuck having an adjusting plug threadedly engaged therein, said actuating plate being located adjacent the opposite ends of said passages from said chuck, said means for closing said chuck comprising springs retained within said passages and compressed between said adjusting plugs and actuating plate, respectively, whereby said actuating plate is continuously urged by said springs in one direction axially of said indexing body.

References Cited in the file of this patent

UNITED STATES PATENTS

| | | |
|---|---|---|
| 397,664 | Simpson | Feb. 12, 1889 |
| 1,341,015 | Lavoie | May 25, 1920 |
| 1,786,147 | Bullard | Dec. 23, 1930 |
| 2,122,360 | Sloan et al. | June 28, 1938 |
| 2,704,214 | Beausoleil | Mar. 15, 1955 |

FOREIGN PATENTS

| | | |
|---|---|---|
| 306,291 | Great Britain | Feb. 21, 1929 |